United States Patent [19]
Sawyer, Jr.

[11] Patent Number: 5,617,974
[45] Date of Patent: Apr. 8, 1997

[54] STORAGE DISPENSING CONTAINER

[76] Inventor: Thomas K. Sawyer, Jr., 308 Oyster La., Virginia Beach, Va. 23456

[21] Appl. No.: 394,481

[22] Filed: Feb. 27, 1995

[51] Int. Cl.$^6$ .................................................. B65D 35/08
[52] U.S. Cl. ..................... 222/107; 222/465.1; 222/486; 222/561
[58] Field of Search .................................... 222/107, 486, 222/502, 565, 465.1, 561, 175

[56] References Cited

U.S. PATENT DOCUMENTS

| | | | |
|---|---|---|---|
| 1,137,683 | 4/1915 | White | 222/486 X |
| 1,172,005 | 2/1916 | Butterfield | 222/486 X |
| 1,623,107 | 4/1927 | Goodykoontz | 222/107 |
| 2,624,492 | 1/1953 | Seltzer | 222/486 X |
| 2,779,126 | 1/1957 | Cook | 222/565 X |
| 3,179,298 | 4/1965 | Collins | 222/486 X |
| 3,228,585 | 1/1966 | Fleming | 222/565 X |
| 3,239,107 | 3/1966 | West et al. | 222/486 X |
| 3,246,803 | 4/1966 | Laub, Jr. | 222/565 X |
| 3,369,709 | 2/1968 | Clauss | 222/107 |
| 3,463,358 | 8/1969 | Wenzler | 222/107 X |
| 3,567,074 | 3/1971 | Brown | 222/107 |
| 4,576,316 | 3/1986 | Foster | 222/565 X |
| 4,596,363 | 6/1986 | Wellard | 222/565 X |
| 5,493,852 | 2/1996 | Stewart | 222/561 X |

FOREIGN PATENT DOCUMENTS

| | | | |
|---|---|---|---|
| 201330 | 6/1958 | Germany | 222/486 |
| 166736 | 7/1921 | United Kingdom | 222/486 |

*Primary Examiner*—Kevin P. Shaver

[57] ABSTRACT

A packaging, storage and dispensing container particularly useful for agricultural products. The container is constructed of a flexible material such as multi-wall paper or a flexible plastic material. The invention is a flattened tubular bell shaped design having a bottom closed terminal portion. A two part plastic strip with a multiplicity of evenly spaced discharge openings is just above this seam and generally across the same. By adjusting the discharge openings in the two part strip to become partially to fully aligned a variety of different size aperture openings can be achieved in which to dispense the product in the container. If all the product is not used, then the two strips can be manipulated to fully mis-align the discharge openings, thus re-sealing the container.

3 Claims, 2 Drawing Sheets

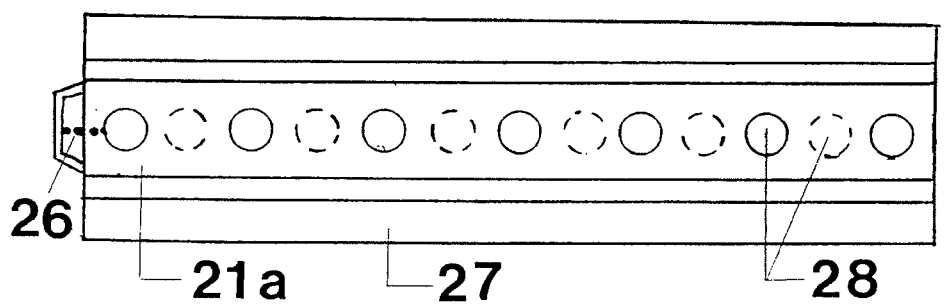
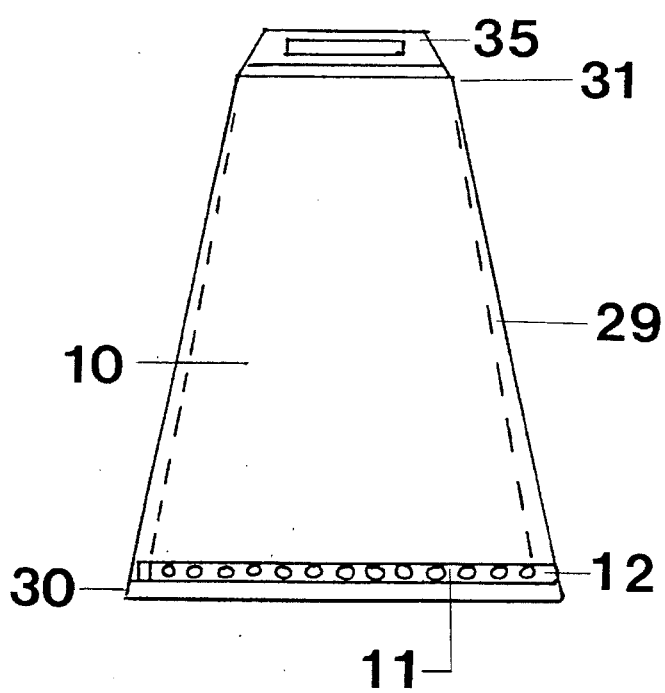
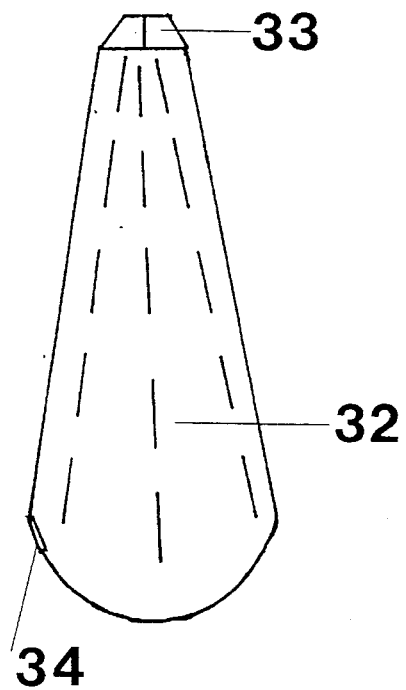
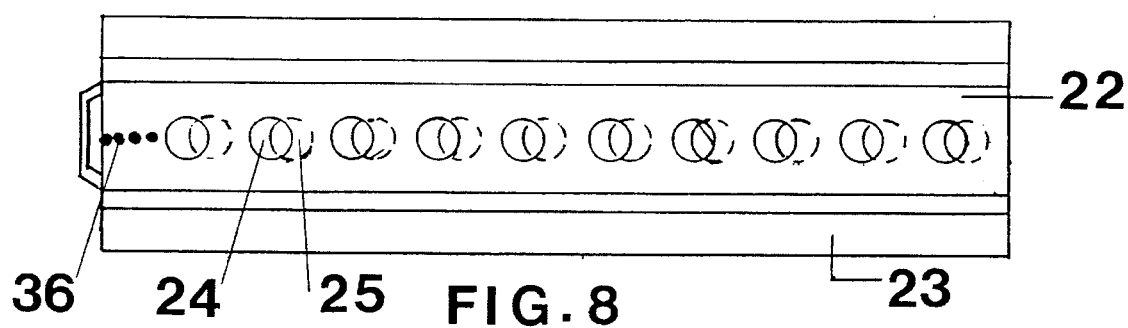

STORAGE DISPENSING CONTAINER

BACKGROUND OF THE INVENTION

Field of the Invention

This present invention relates to an improved Storage-Dispensing Container. This Storage-Dispensing Container would primarily be constructed of a flexible material, such as multiple layered paper or a flexible plastic material. The container is a flattened bell shape of a tubular bag design. The bottom end has an adjustable plastic strip with a plurality of discharge holes while the top end has a carrying handle and a means for filling product into the container. It is primarily used for the spreading of dry fluent materials such as fertilizer, seeds, and other products of a granular, pellet or powdered form. This present invention is to provide a convenient means of shipping, storing and dispersing various agricultural products.

Other objects and advantages of this invention will be apparent hereinafter from the specifications and the appended claims.

The attached drawings will illustrate the preferred embodiments of this invention in meeting the above objectives.

DESCRIPTION OF THE PRIOR ART

A review of the art in the field reveals a number of devices designed to store various products and also as a means of disbursing the product. Examples include:

U.S. Pat. No. 3,369,709 issued to Kenji Nakamura which describes a re-sealable dispenser-container. This invention is completely limited in scope and application for broadcasting purposes as it has simply one or two longated openings.

U.S. Pat. No. 3,567,074 issued to Bernard Beau Brown. This invention also is limited as it does not have any means to control the amount of product to be dispersed as there is no way to adjust the size of the aperture openings.

A review of the prior art reveals that the previous inventions are very limited in use and scope. That is, they do not have a reliable means of re-sealing the container if all the product is not used. Also, they do not have a means of adjusting the size of the aperture openings to accomodate different size products to be dispensed or to control the rate of flow of the product by the size of the aperture opening.

SUMMARY OF THE INVENTION

A principle objective of the present invention is to provide an inexpensive, hand carried, hand manipulated, storage and dispensing container. An objective to this invention is to provide a ready to use container with a dispersing capability built into the package. Whereby a consumer can purchase the product they desire in a self-contained spreader for distributing the particular packaged product.

Another objective is to have a container, whereby, it can be resealed for storage if all the product is not used during its initial use. The combination storage and dispensing container is comprised of a flattened tubular bag design in which there are two outer walls. The bottom end has a seam which connects the two outer walls together which defines a container for holding a particular product.

A plastic strip is affixed to one of the outer walls along and just above the bottom seam from side to side of the container. This plastic strip has a plurality of discharge apertures in it that can be of various shapes and sizes, but evenly spaced, depending on the product to be dispersed. This fixed strip has two (2) grooves molded in it, that act as guides, that also go from side to side of the container. A moveable strip, which has a plurality of discharge apertures also evenly spaced across it, fits into the grooves of the fixed plastic strip.

When the Storage-Dispensing Container is purchased at the store, the discharge apertures in the sliding strip are centered between holes in the fixed strip, as to make the container sealed. When the product is ready to be dispersed the moveable strip is moved along the fixed strip grooves to align the apertures of the fixed plastic strip with the moveable plastic strip.

Gusetts are formed on each side of the flattened container that go from the bottom corners of the container and are joined upward toward the carrying handle that is affixed to the top portion of the container. In the packaging process, the container is filled with the desired product before the handle is affixed to the top portion of the container.

Additional objects, and advantages of the present invention will become apparent from a consideration of the following detailed description of the preferred embodiments.

BRIEF DESCRIPTION OF THE DRAWING

FIG. 5 Is a top view of the dispensing mechanism in the closed position.

FIG. 6 is a front view of the storage-dispensing container.

FIG. 7 Is a side view of the storage-dispensing container.

FIG. 8 Is a top view of the dispensing mechanism in the half-open position.

DESCRIPTION OF THE PREFERRED EMBODIMENTS

With particular reference to the drawings the present disclosure includes a "Storage-Dispensing Container having variable discharge openings with a means of closure."

Figure 1:
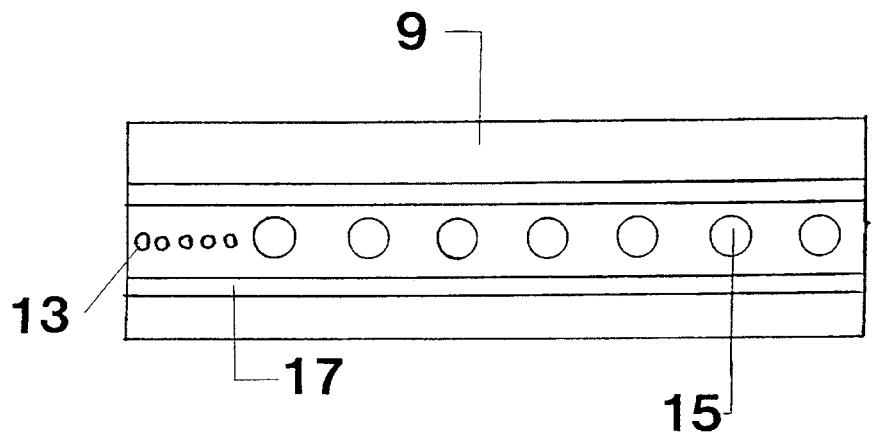
FIG. 1 Is a top view of the base strip that is affixed to a container.
Figure 3:
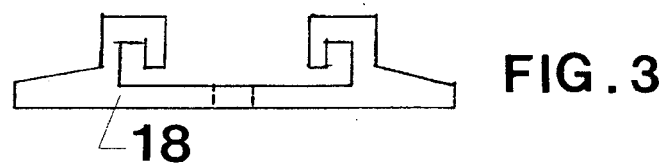
FIG. 3 Is the end view of the base strip.
Figure 2:
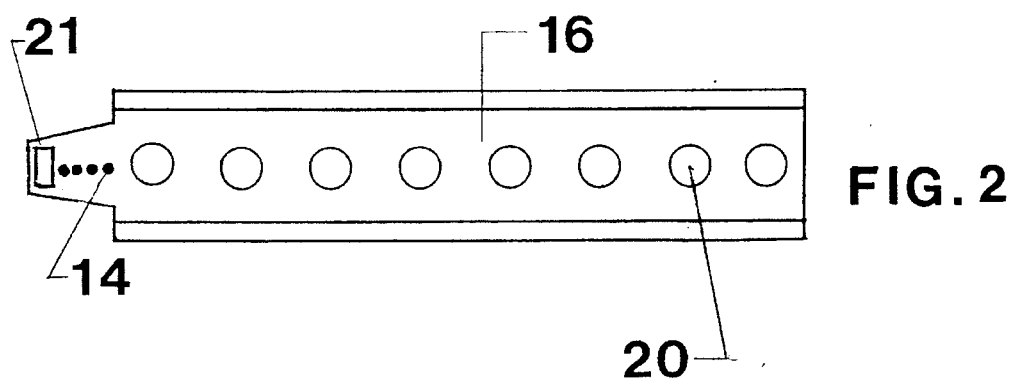
FIG. 2 Is a top view of the sliding strip that slides back and forth on the base strip.
Figure 4:
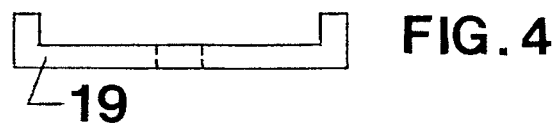
FIG. 4 Is the end view of the sliding strip.

FIG. 1 depicts the base strip 9 before it is affixed to the multi-wall storage and dispensing container 10 as depicted in FIG. 6. The strip 11 is affixed at the lower end of the storage-dispensing container and is made rigid enough as not to collapse, or fold up under the weight of the product inside the container. The discharge apertures 12 which penetrate the strip can be of various sizes and shapes as to easily disperse various products. In FIG. 1, the base strip 9 depicts a series of 5 small holes 13 which accept the adjustment studs 14 on the sliding strip 16, FIG. 2, to facilitate adjusting the discharge aperture on the base 15 and sliding strip 16 congruently. FIG. 2 depicts the sliding strip 16 which fits into the grooves 17 of the base strip 9. FIG. 3 depicts an end view of the base strip 18 and FIG. 4 depicts an end view of the sliding strip 19. This sliding strip 16 is also made with discharge apertures 20 and is rigid enough as not to fold up or bend under the weight of the product to be dispersed. The sliding strip apertures 20 can be of different shapes and sizes as to accomodate different kinds of products. The discharge aperture holes in the sliding strip 20 do not line up with the discharge holes in the base strip 15 when the dispensing strip is in the closed position 21, FIG. 5. This is facilitated by the adjustment studs 14, being locked in place into the adjustment holes 13. When the determination has been made as to what size opening, that is setting, the aperture dispensing holes should be set for in accommodating a particular product to be dispersed, then the pull tab 21 is pulled, releasing the adjustment studs 14 from the adjustment holes 13. Then the sliding strip 22, is moved along the base strip 23 to align the aperture openings 24 of the sliding strip with the base strip 25. This alignment can be regulated from one-quarter open, to one-half open, to three-quarters open, to fully opened and locked into place with the adjustment studs.

If all of the product is not used at this time, then the sliding strip 21a can be unlocked at the adjustment studs 26 and moved along the base strip 27 until the aperture holes 28 no longer align and thus be locked once again in the closed position for storage. Ten (10) depicts a typical-dispensing container. The dispensing container can be made of various types of material. For purposes of illustration the Storage-Dispensing Container 10 could be made of multi-layered paper, such as the type dry dog food comes in, and is also accordion creased, that is gusseted on the sides 29 to allow for expansion or decreasing with the density of the product within. The Storage-Dispensing Container is purposely made proportionately larger at the base 30 than at the top, 31. This is to facilitate the product in the container to be downward forced in order to mare evenly distribute the product to the distribution strip, this also prevents bridging of the produce. Thirty two (32) renders a side view of the dispensing container depicting the split handle, 33 and the dispending strip 34. Thirty five (35) is a split handle affixed to the top of the Storage-Dispensing Container 10. The handle is the two part kind that snaps together. This is also where the container opens to facilitate filling product into the container. FIG. 5 illustrates the dispensing strip in the closed position. FIG. 8 illustrates the dispensing strip in the half open position after the sliding strip has been moved along the base strip, the adjustment studs are locked in place into the adjustment holes of the base strip 36.

I claim:

1. A packaging and dispensing container for dry, fluent granular materials comprising: a multi-ply flexible walled container having a bottom closed end portion and a top end, said top end having means for handling said container, a first plastic strip attached to and extending generally across said bottom end portion, said first plastic strip having a multiplicity of evenly spaced apertures communicating with the interior of the container, said strip having a grooved channel for slidably accepting a second plastic strip having a multiplicity of evenly spaced apertures, wherein movement of said second strip varies the alignment of the apertures in the first and second strips from a closed position where no apertures are aligned and no material is discharged to partially opened positions where the apertures in the first and second strips are partially aligned where material is discharged at a varied rate according to the amount the apertures are aligned to a fully open position where all the apertures are aligned and material is discharged; and said bottom end portion of the container having a larger cross-sectional area than the top end of the container such that it has a bell-like shape for forcing the granular material to the bottom of the container and to prevent bridging of the granular material.

2. A packaging and dispensing container for dry, fluent granular materials according to claim 1 wherein said means for handling comprises a split-type handle, said split-type handle being formed of first and second handle halves with each half being affixed to an opposite side wall of the container.

3. A packaging and dispensing container for dry, fluent granular materials according to claim 1, further comprising means for locking said second strip in a desired position, said means for locking comprising a series of small holes in the first strip and adjustment studs in the second strip.

* * * * *